Figure 2:
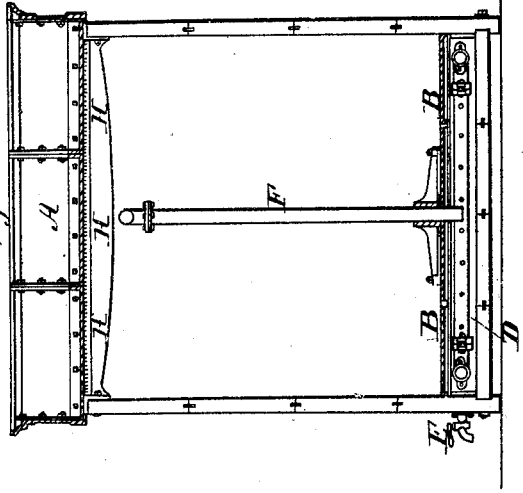

W. Watt. Sheet 1. 3 Sheets.
Pulp Digester.
N°. 11,981. Patented Nov. 21, 1854.

Inventor;
William Watt

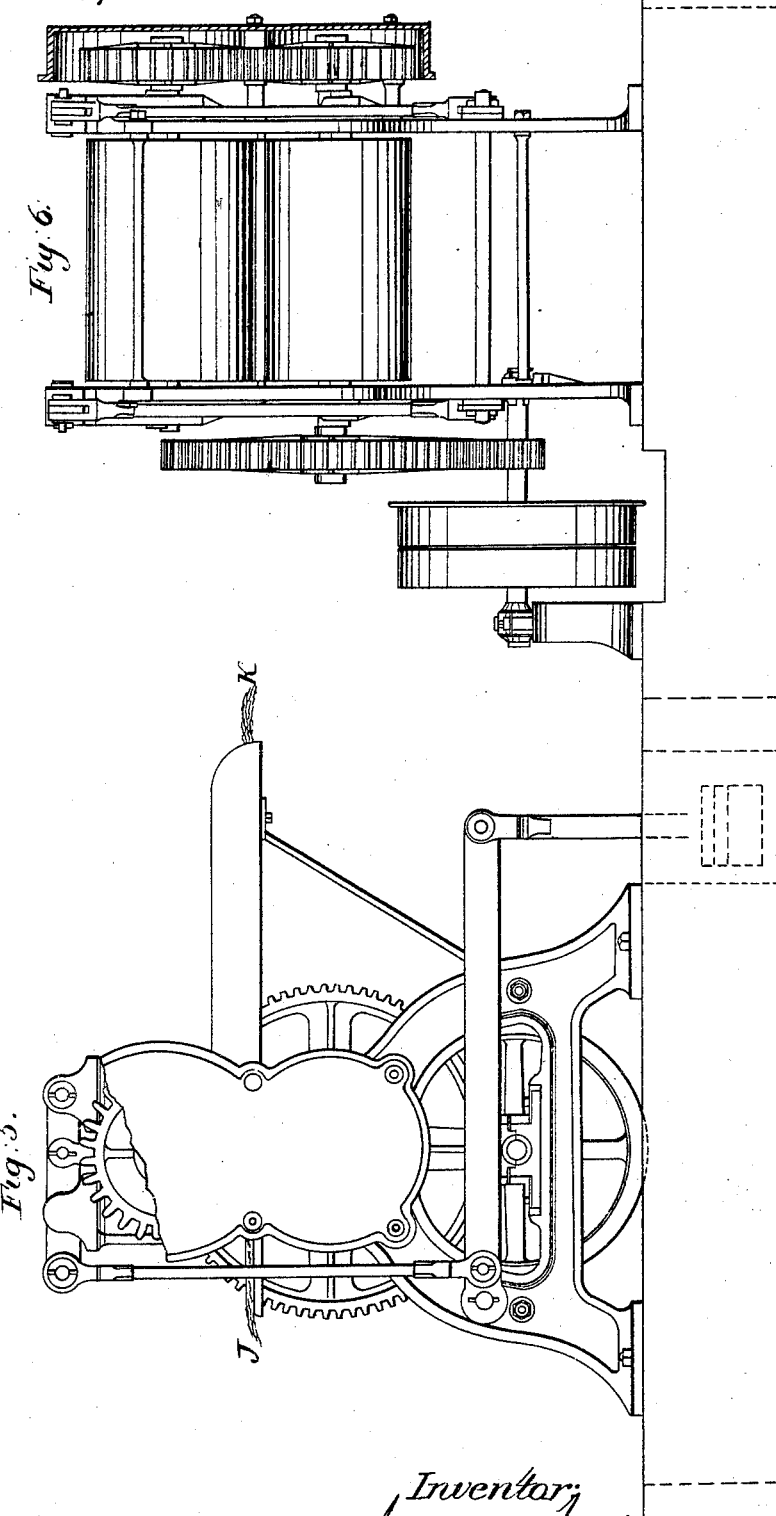

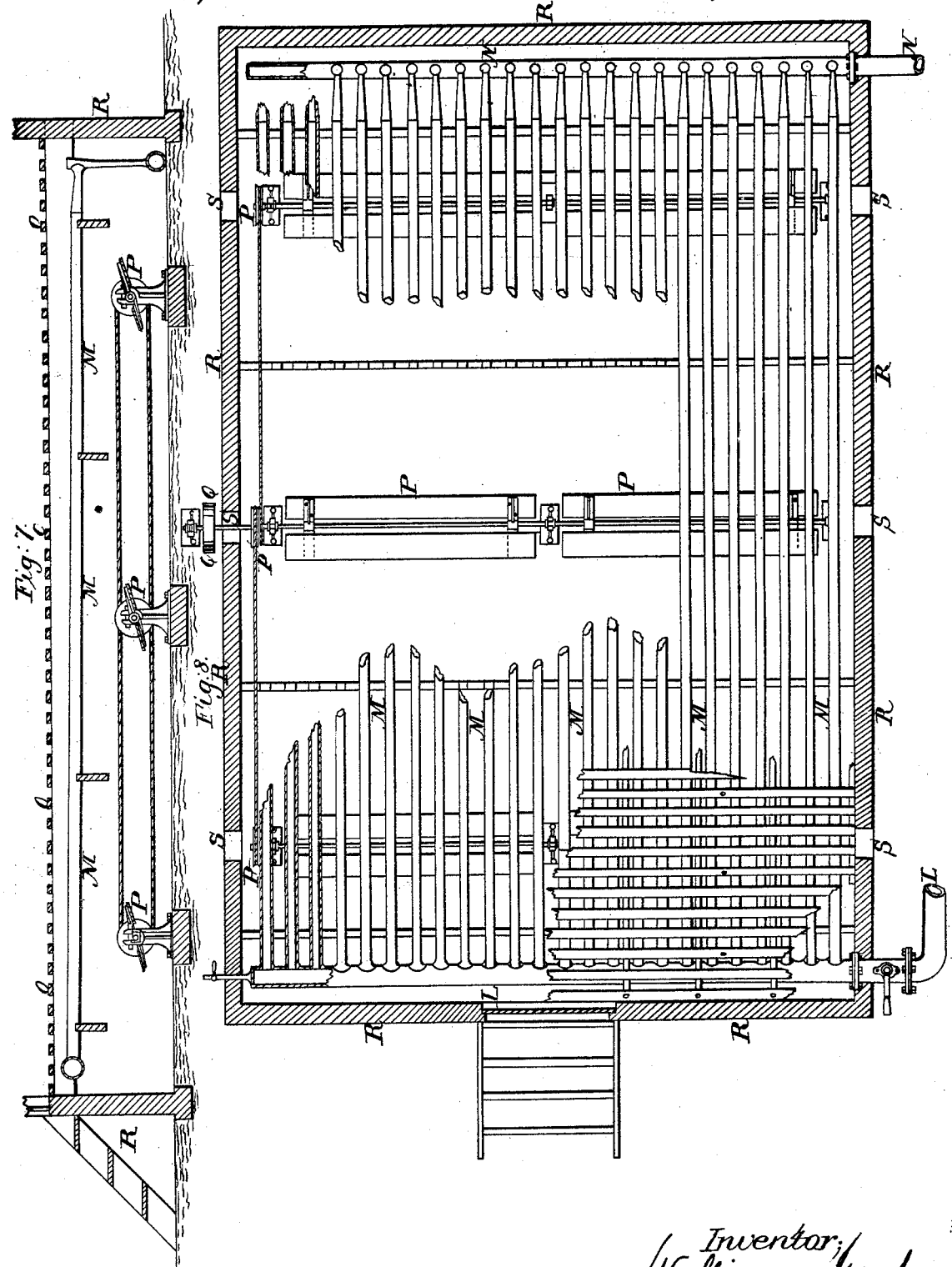

UNITED STATES PATENT OFFICE.

WILLIAM WATT, OF GLASGOW, SCOTLAND.

HEMP-ROTTING PROCESS.

Specification of Letters Patent No. 11,981, dated November 21, 1854.

*To all whom it may concern:*

Be it known that I, WILLIAM WATT, of Glasgow, in the county of Lanark, North Britain, manufacturing chemist, have invented certain new and useful " Improvements in the Treatment and Preparation of Flax and other Vegetable or Fibrous Substances; " and I do hereby declare that the following is a full and exact description thereof, reference being had to the annexed drawings, making a part of this specification.

My invention consists in improvements in the preparing of flax and other similar vegetable fibrous substances by subjecting the straw of the flax or other plant as received from the grower to a process or processes for the purpose of causing certain volatile oils, which are found in the plant, to be carried off in a state of vapor, removing the nitrogenous and other extractive matters and obtaining the fiber detached, or rendering it capable of being detached, from the epidermis or outer skin and the pith or boon and also from the root of the plant, in a state fit for scutching, in a more perfect, speedy and economical way than has hitherto been practicable.

In performing my invention I not only avoid the ordinary steeping and fermenting processes but I am also enabled to dispense with the use of a vacuum, or of alkalis, acids, or other similar chemical agents; I am also enabled to dispense with the tedious, precarious and expensive process of grassing.

In performing my invention I procure as an incidental product a liquor of nutritious quality which can be advantageously used either for feeding cattle or for manuring land.

While the improvements which I am now about to describe are applicable to the preparation not only of flax but of other similar vegetable fibrous substances, I have in the following description or many parts thereof alluded to flax only so as to avoid prolixity.

In performing my invention I first take the flax plant as I receive it from the grower, that is to say, after it has been dried and harvested, and after seeding it in the usual way, I place it in a suitable vessel or chamber which when closed must be steam tight or nearly so and upon the top of which I construct a tank through which cold water is kept constantly running so that it may act as a refrigerator. A stratum of the straw made up in sheaves is laid on a perforated floor which is situated about eight inches above the bottom of the steam vessel, and other similar strata of straw are placed above it until the vessel is nearly full. The process begins by admitting steam into the vessel through horizontal steam pipes perforated with holes which are placed between the perforated floor and the bottom; when the steam after rising up through the floor and through the flax straw is condensed by coming in contact with the refrigerator and the distilled water thus formed falls in a continuous shower on the top of the flax straw from a number of small iron points on the lower surface of the tank bottom (which forms the top of the steam vessel) and percolating the mass, finds its way into the space between the floor and bottom of the vessel.

At the commencement I turn on as much steam as will be sufficient not only for the above purpose, but to lift by its pressure a self-acting spindle valve placed on the top of the small vessel, in a tube which rises up through the water in the tank, and the steam being at a high temperature will disengage from the flax the volatile oils or other volatile matters which it contains, and the steam escaping from the valve will carry off those volatile matters, and in passing off produce a perceptible odor. I find the removal of those oils or other substances beneficial to the quality of the flax when prepared as well as important with a view to facilitate the subsequent parts of my process. As soon however as I discover from the diminution of the odor in the steam thus escaping that the volatile matters or the greater part of them have been carried off, I diminish the supply of steam so that the spindle valve shuts of itself. While this is in progress the condensed steam or hot water assisted by the great heat in the steam vessel gradually dissolves and removes the nitrogenous and other extractive matters in the straw and percolates to the bottom of the vessel.

Still further to aid the process I from time to time or continuously if necessary force up a portion of the condensed steam or hot water from the bottom of the vessel into an open cistern placed above it, whence it runs off into a horizontal perforated pipe placed along the ceiling of the steam vessel, and thence falls in a shower on the top of the flax straw and along with the water produced by condensation percolates down through the mass of flax. From time to time as the condensed steam or hot water at the bottom of the steam vessel becomes highly charged with extractive matters I run it off either from the cistern or the lower part of the steam vessel and this solution of extractive matters may be used for the purpose of feeding cattle or manuring the land. I continue this action of the steam and water until I find from the appearance of the straw in the vessel and the color of the solution that the nitrogenous and other extractive matters have been removed.

During its progress the interior of the vessel is maintained at a high temperature. I prefer a heat of at least 212 degrees of Fahrenheit for expediting the process and effecting the most beneficial results. The time required for this steaming and washing varies according to the quality of the straw and other circumstances, but I find about 12 hours to be generally sufficient to remove all or as much as necessary of the oleaginous nitrogenous and other extractive matters.

In order to enable me to remove the flax straw from the steam vessel immediately after the completion of the process just described, I sometimes pass cold water through it by which the workmen are enabled immediately to remove the straw from the vessel. In the process which I have described, I subject the flax straw to the action of steam and also of currents of hot water at a high temperature. The straw may however be subjected to the action of streams of hot water only, by means of which the extractive matters or as much as necessary of them may be disengaged from the straw. I prefer to employ a temperature at or near to the boiling point but the temperature should always be above 150° of Fahrenheit's thermometer. A stream or streams of hot water must be made to act upon the straw of the flax, so as to obtain the benefit not only of the solvent power of the hot water but also of its mechanical action as a current impelled against the straw to be operated upon. This operation upon the straw of flax may be effected by introducing a current of hot water only into a vessel similar to that hereinbefore mentioned, through the horizontal pipe running along the ceiling of the vessel as hereinafter described or in a boiler such as is generally used by bleachers with a throw pipe or vomiter or in an open vessel by any other convenient means.

After the flax straw has been deprived of its volatile oils and extractive matters in manner already described it is taken out of the vessel while still swollen and thoroughly saturated with water and in a state to allow of the fiber being easily separated from the outer skin and pith. It may then be subjected to any of the usual operations which follow the ordinary process of steeping, but I deem it more advantageous to subject the flax straw (after the sheaves have been opened) to mechanical pressure between two smooth rollers which act together at a uniform speed and are subjected to a regulated amount of pressure. This operation I repeat if necessary with the same set of rollers or others of the like construction.

The objects of this rolling and crushing process are to accelerate the drying, to rub off or displace the epidermis or outer skin, to crush and flatten the pith or boon, and split it up longitudinally so as to make it removable more easily and with less violence to the fiber of the flax when subjected to the process of scutching and at the same time to obtain the fiber especially at or near to the root of greater length and in larger quantity.

The straw which has been prepared in manner already described may be thoroughly dried in any of the modes now in general use. But I prefer to dry it by at once placing it in a stove heated to a temperature of from 100 to 150 degrees of Fahrenheit and having an artificial current of heated air passing through it. The flax straw which has been thus prepared and dried is then ready for the ordinary process of breaking and scutching, and so rapidly may the various operations which I have described be performed, that within 24 hours from the seeding of the flax it may be subjected to my process or processes above described and scutched. It will however be found generally advisable to allow the straw to remain a day or two after being dried before being scutched.

In the drawings which are annexed to this specification I have shown apparatus convenient for carrying my invention into effect but which apparatus may be varied.

Figure 4:
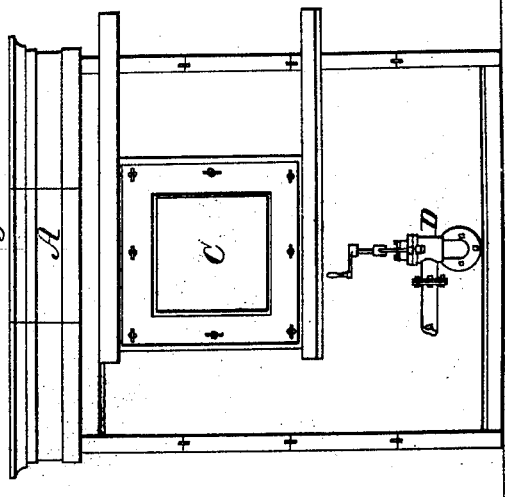
Figure 1:
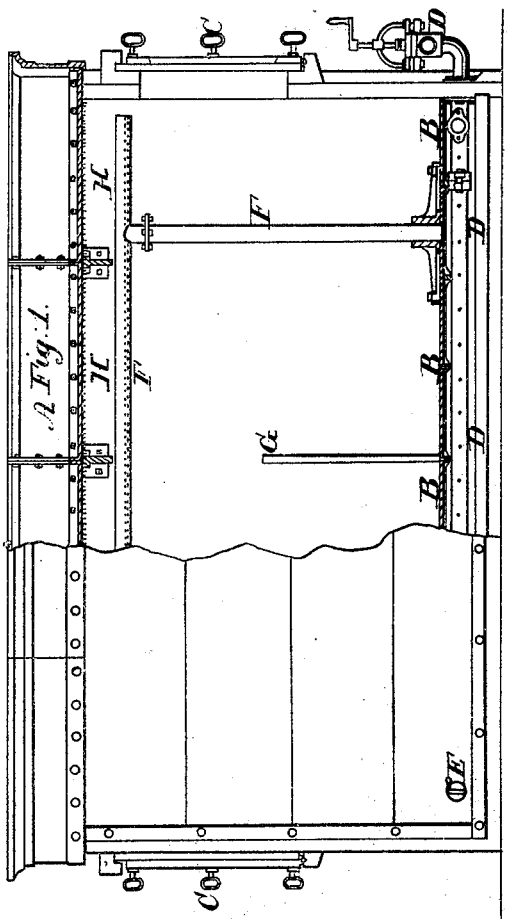
Figure 3:
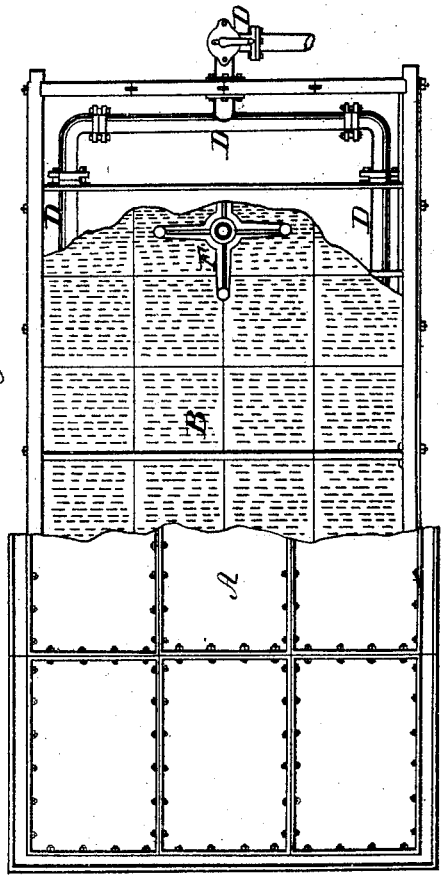

Figures 1, 2, 3 and 4 exhibit a plan and elevation of a steam vessel or chamber in which the steaming and washing process may be carried on. It may be made of iron or wood but if made of wood the refrigerator and the perforated floor had better be of iron. The dimensions which I have adopted and found to be convenient are about twelve feet long, six feet broad, and six feet deep, but the size and dimensions are not material except that care should be taken that the perpendicular height of flax straw in the vessel should not be so great as to prevent the free percolation of water down through it as before mentioned; A is the tank upon and forming the top of the steam vessel and acting also as a refrigerator and on the lower surface of this refrigerator a number of iron points are cast. I have not thought it necessary to show the mode in which the cold water is introduced into or led away from this tank, as it may be done in any way adapted to the convenience of the situation.

B is the perforated iron floor on which the flax straw is laid. C. C. are the horizontal perforated steam pipes about 3 inches in diameter, into which steam is admitted through the valve and pipe D. E is a self acting spindle valve fitted into the top of the steam vessel or bottom of the tank A; F is a supply pipe through which the condensed water is forced into the cistern H. which may be placed in any convenient position above the vessel; G is an overflow pipe; K is a perforated horizontal pipe communicating by means of the perpendicular pipe I with the cistern H; L is a discharge cock for the purpose of running off the solution at pleasure or for conducting it to the cistern H through the pipe F; MM are doors which are used for the purpose of putting in and taking out flax straw; N is a self acting return or safety valve, the object of which is to admit air and prevent the formation of a vacuum within the vessel. If the flax be subjected to the action of hot water only, it may be introduced at the top of the vessel by means of a perforated tube such as shown at KK Figs. 1 and 2 in which case the steam pipes and refrigerator will be unnecessary.

Figs. 5 and 6 represent an end and side view of the machine which I use for rolling and crushing the flax straw after it has been deprived of its extractive matters; a. a. are two smooth cast iron rollers which I prefer to be made of about 16 inches diameter and revolving about 20 to 30 revolutions per minute; b. b. are two spur wheels which cause each of the rollers to revolve at the same speed; c. c. are a wheel and pinion used for the purpose of giving a diminished motion to the rollers, and the better allowing the machine to be driven by a belt and pulleys of ordinary size; d. is a fly wheel regulating the uniformity of the motion; e. e. are compound levers regulating the pressure of the one roller on the other, but capable of yielding to any inequality in the thickness of the flax straw passing between the rollers; f. f. are fast and loose pulleys to which motion is communicated from the moving power by means of a belt; g is a feeding board upon which the sheaves of flax straw are opened out and spread before they pass between the rollers; h is the point at which the straw is received and taken away after it has passed through the rollers.

Having now described the nature of my invention and the means of carrying the same into effect I hereby declare that I claim—

The application to flax straw and similar vegetable fibrous substances of a current of steam and hot water or hot water alone at a temperature of not less than one hundred and fifty degrees of Fahrenheit thermometer substantially as herein described for the purpose of carrying off the volatile matters of such substances and dissolving and removing their nitrogenous and other extractive matters in manner hereinbefore described without the aid of fermentation acids or alkalis.

WILLIAM WATT.

Witnesses:
ROBERT DONALD,
EDWARD BRADSHAW.